United States Patent
Citrich et al.

(10) Patent No.: US 6,933,458 B2
(45) Date of Patent: Aug. 23, 2005

(54) METHOD FOR POSITIONING A WELDING BOLT AND BOLT WELDING HEAD

(75) Inventors: Ulrich Citrich, Gevelsberg (DE); Steffen Hailer, Bochum (DE); Jürgen Madsak, Breckerfeld (DE)

(73) Assignee: Nelson Bolzenschweiss-Technik GmbH & Co. KG, Geverlsberg (DE)

( * ) Notice: Subject to any disclaimer, the term of this patent is extended or adjusted under 35 U.S.C. 154(b) by 244 days.

(21) Appl. No.: 10/204,120

(22) PCT Filed: Feb. 21, 2001

(86) PCT No.: PCT/DE01/00670

§ 371 (c)(1),
(2), (4) Date: Nov. 5, 2002

(87) PCT Pub. No.: WO01/62426

PCT Pub. Date: Aug. 30, 2001

(65) Prior Publication Data

US 2003/0141347 A1 Jul. 31, 2003

(30) Foreign Application Priority Data

Feb. 21, 2000 (DE) .......................... 100 07 837

(51) Int. Cl.⁷ ................................. B23K 9/20
(52) U.S. Cl. ........................... 219/98; 219/99
(58) Field of Search ....................... 164/98, 99; 901/42; 219/98, 99

(56) References Cited

U.S. PATENT DOCUMENTS

| | | | | |
|---|---|---|---|---|
| 4,650,957 A | * | 3/1987 | Cullen et al. | 219/124.03 |
| 5,406,044 A | * | 4/1995 | Killian et al. | 219/99 |
| 5,502,291 A | * | 3/1996 | Cummings | 219/98 |
| 5,977,506 A | | 11/1999 | von Däniken | 219/99 |

FOREIGN PATENT DOCUMENTS

| | | |
|---|---|---|
| DE | 4314528 | 11/1994 |
| DE | 4336104 | 11/1994 |
| DE | 19828986 | 12/1999 |
| EP | 0297031 | 12/1988 |
| JP | 60238089 | 11/1985 |

* cited by examiner

Primary Examiner—Kiley S. Stoner
Assistant Examiner—Len Tran
(74) Attorney, Agent, or Firm—Howard & Howard

(57) ABSTRACT

The invention relates to a method for positioning a welding bolt (15), held in a bolt welding head (3), whereby the robot (5), to which the bolt welding head (3) is fixed, moves the bolt welding head sideways until a touch sensor (21) contacts a side wall (25) of a workpiece. The position of the side wall (25) is thus detected and the bolt welding head (3) can be moved through a set amount (Y) into a welding start position, from whence the welding bolt (15) can be welded to the workpiece (9) by the displacement in the direction of travel (V). The welding bolt (15), thus, always has the required separation (Z) from the side wall (25), independent of tolerances in the workpiece.

7 Claims, 2 Drawing Sheets

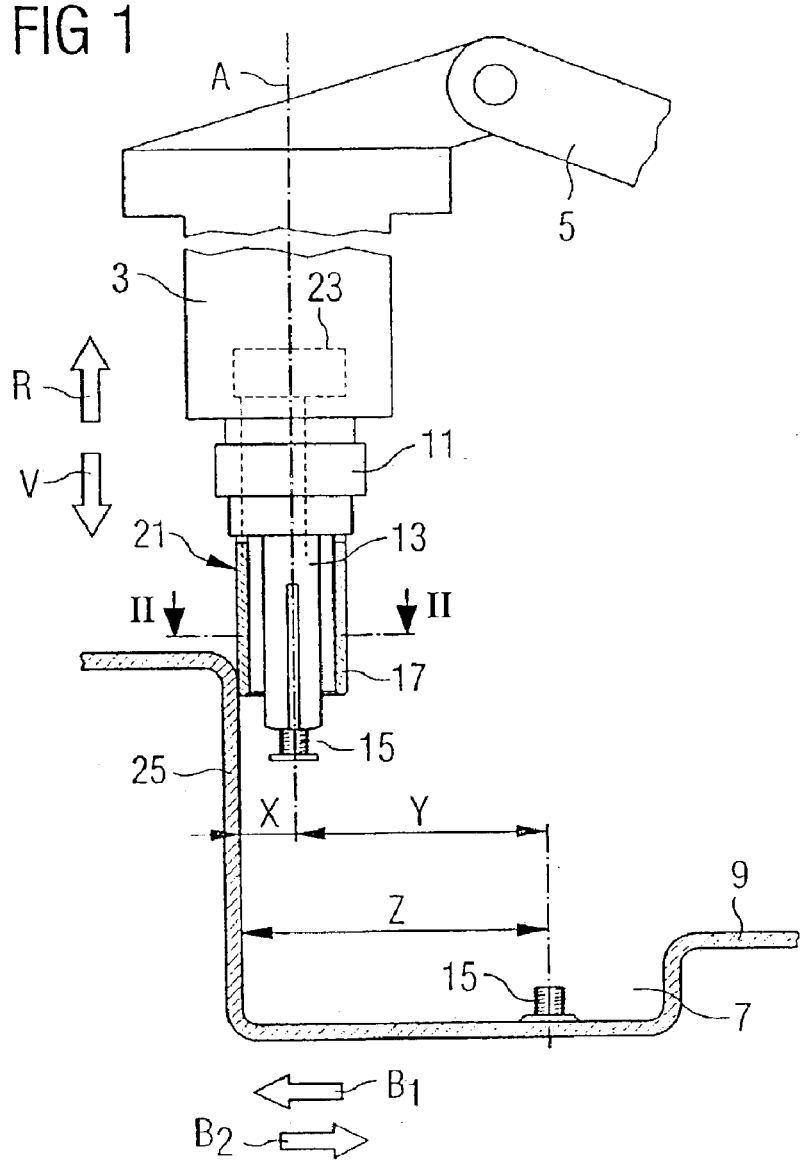
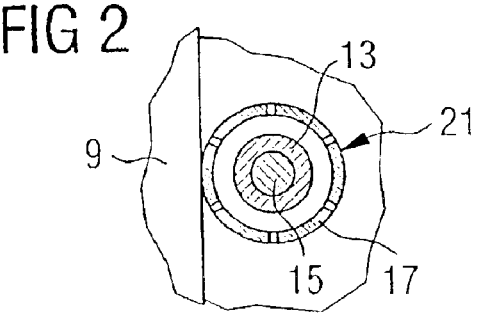

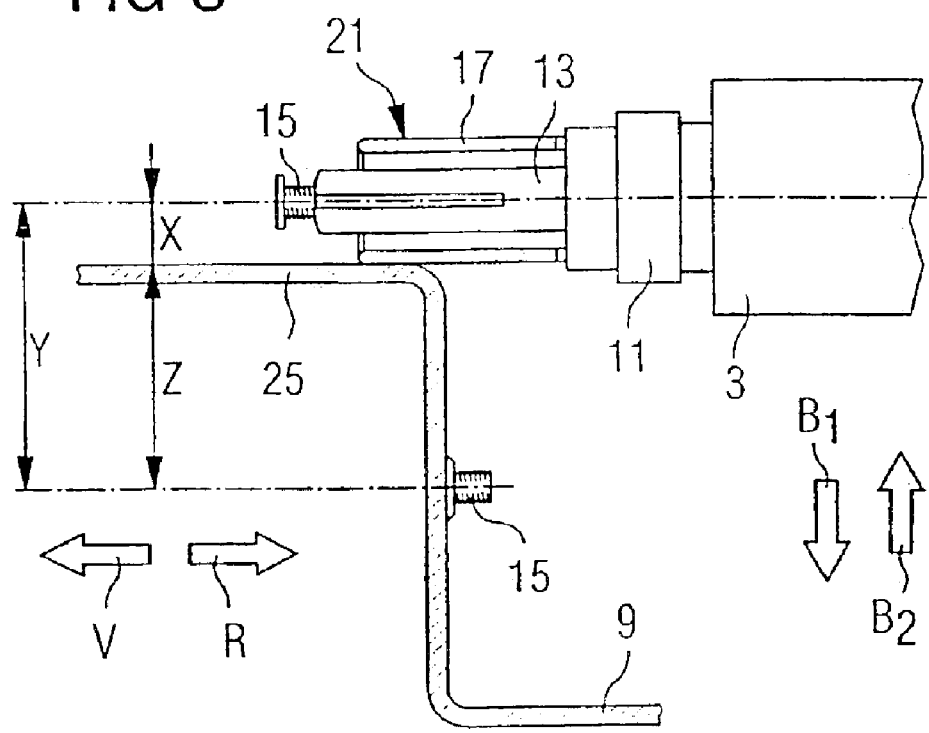
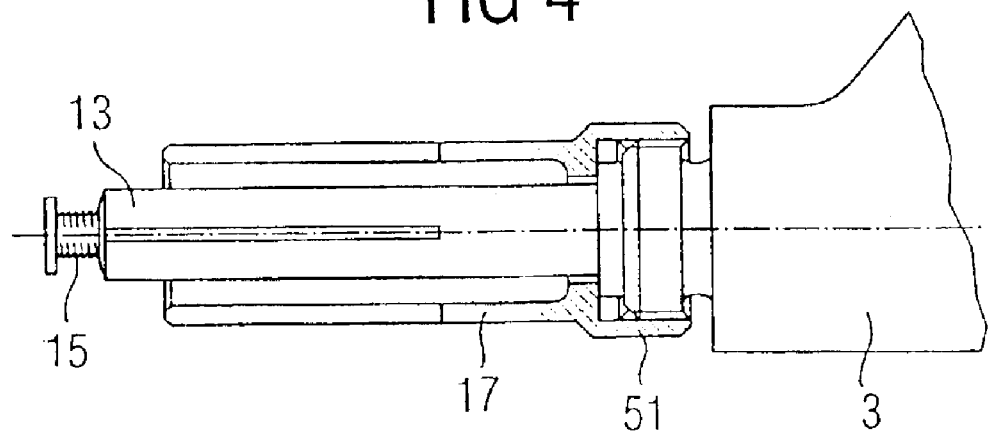

METHOD FOR POSITIONING A WELDING BOLT AND BOLT WELDING HEAD

This application claims priority to International Patent Application No. WO 01/62426 filed on Aug. 30, 2001 and to German Patent Application No. 100 07 837.0 filed on Feb. 21, 2000.

The invention concerns a process for positioning a welding bolt that is mounted on a bolt welding head whereby the bolt welding head is designed for a programmable multiaxial operating mechanism and whereby the welding bolt is delivered during welding in a feed direction to a workpiece onto which the bolt is being welded.

The invention also concerns a bolt welding head, in particular for executing movement described by the process, with a welding axle capable of moving in an axial direction, a welding bolt retainer connected to the welding axle and a contact recognition device that ascertains contact between the welding bolt and the workpiece during operation of the welding axle in a feed direction.

Until the present time, welding bolts have been welded onto the workpiece as follows:

The multiaxial operating mechanism, usually a programmable industrial robot, brings the bolt welding head close to the workpiece surface and into the so-called welding starting position. From this welding starting position, the bolt welding head moves the welding bolt in the feed direction until the welding bolt comes into contact with the workpiece surface. A contact circuit is activated upon contact between the welding bolt and the workpiece to determine the position of the workpiece in the feed direction. This position is saved and the welding bolt is raised a certain distance from the workpiece. When the welding bolt is raised, stroke ignition generates an arc and the welding bolt is moved from the bolt welding head, path or speed controlled, for example, into the feed position and dipped in the melt.

Automobile manufacturing requires the help of robots for welding bolts in flanges, depressions or grooves on the workpiece. The position of the welding bolt is very important for this process because significant deviation in the position of the welding bolt can lead to major problems during subsequent applications of the welded bolt (e.g. upon installation of mountings, clips or metal strips). Because the body of a vehicle, for example, on which the welding bolt will be attached has position tolerances for transport system's clamping device in the automobile factory and because the body itself can, in part, have significant tolerances, the situation of the nominal position of the welding bolt moves around in the space causing the welding bolt to be welded too far from the side walls in flanges, depressions or grooves.

The invention creates a process which positions the welding bolt precisely and creates a bolt welding head that positions the bolt on the workpiece in a more exact manner.

The invention process encompasses the following steps to achieve this goal:

a) the bolt welding head is brought to the workpiece by the operating mechanism;

b) the operating mechanism moves the bolt welding head diagonal to the feed direction, to which the welding bolt will be moved during later welding, until a contact recognition device designed for the bolt welding head makes contact with a side surface of the workpiece;

c) the operating mechanism moves the bolt welding head diagonal to the feed position by a specific nominal measurement into a welding start position; and d) the welding bolt will be moved in the feed direction until contact is made with the workpiece surface.

Preferably, an arc between the welding bolt and the workpiece will then be generated by stroke ignition when the welding bolt is raised from the workpiece surface.

During the invention process, not only the axial position of the workpiece is determined, but also the radial position of the workpiece by detecting a side surface of the workpiece and determining its position. This makes it possible to achieve the exact nominal distance (distance of the side surface from the welded bolt) and to position the welding bolt precisely in flanges, depressions or grooves in the workpiece.

Further development of the invention includes moving the operating mechanism of the bolt welding head in step b) in the first direction sideways toward a side surface of the workpiece, whereby a contact recognition device on the bolt welding head signals that contact has been made with the workpiece and whereby the first indicated position contact with the workpiece is recorded and saved. The bolt welding head is then moved in a second direction set opposite to the first direction until it reaches a second position where the contact recognition devices no longer signals that contact is being made with the workpiece. The second position is recorded and saved. A reference value from the first and second position is then determined from which the bolt welding head is moved sideways by the pre-determined nominal measurement into the welding starting position.

The reference value is preferably the average between the first and second position. The reference value determination is based on the bolt welding head approaching the side surface at a specific speed and a specific temporal hesitation occurring until the bolt welding head remains stationary in the first position so as to run over the side surface, so to say, and the first position does not yield the exact side position of the side surface. Also, when moving in the second direction, a temporal hesitation occurs until the contact recognition devices no longer signals contact and/or the bolt welding head remains stationary in the second position. The reference value from the first and second position is then the fictitious actual position of the side surface. The reference values can depend on the speeds that are used to move the bolt welding head in the first and second direction.

In addition, step d) includes the bolt welding head moving the welding bolt, whereby it is also possible for the multiaxial operating mechanism to bring the bolt welding head relatively close to the workpiece surface and the bolt welding head itself then moves the welding axle in the feed direction to achieve contact with the workpiece.

The preferred execution form for the invention process is to use a contact recognition device that determines contact with the workpiece in step d) upon movement in the feed direction to indicate contact with the workpiece in step b) (movement diagonal to the feed position). This means that no significant supplemental effort needs to be made to achieve side position recognition.

The bolt welding head using in the invention is characterized by having a contact recognition device that determines the presence of a side surface on the workpiece upon moving the bolt welding head diagonal to the feed direction. Diagonal to the feed position is preferably at a right angle to the feed direction.

The contact recognition device used to detect the side surface uses a probe to touch the side surface in the preferred execution form.

This probe should be situated elastically with or without a spring on the bolt welding head so that it is not distorted plastically when it comes into contact with the side surface of the workpiece.

According to the preferred execution form, the probe comprises a case surrounding the welding bolt. This has the advantage of enabling the probe to move in any direction and to contact the side surface of the workpiece in front of the welding bolt. Preferably the exterior surface of the case is concentric to the welding axle so that there is constantly an equal distance between the exterior case surface, which produces contact with the side surface, and the axis of the welding bolt independent of movement direction when determining the position of the workpiece.

In addition, the contact recognition device for determining contact between the welding bolt and the workpiece is also the contact recognition device that has the probe so that only one contact recognition device is needed, which serves to recognize position in the feed direction and in the sideways direction.

It is advantageous to fasten the probe on the welding axle and provide it with electrical current. To prevent it from being welded with the welding bolt, it will not be in direct contact with the bolt, whereby both parts used in position recognition are linked with each other electronically.

Other characteristics and advantages of the invention are contained in the following description and from the following illustrations, which will be referenced. The illustrations show:

FIG. 1 a bolt welding head as described in the invention and the workpiece on which a welding bolt is to be welded;

FIG. 2 a cutaway view along the line II—II in FIG. 1:

FIG. 3 the bolt welding head during position recognition in a different workpiece environment; and FIG. 4 an enlarged view of the front end of the welding bolt with a cutaway case.

FIG. 2 displays the front part of a bolt welding head that is fastened to a programmable multiaxial operating mechanism 5 in the form of an industrial robot. Using the bolt welding head, welding bolts 15 are to be welded in a depression 7 on a workpiece 9 in the form of a vehicle mold. The bolt welding head has linear drive that is not shown in greater detail, which can move a welding axle 11 with a welding bolt retainer 13 fastened Onto it in an axial direction, i.e., feed direction V and the opposing direction R.

FIG. 1 displays a welding bolt 15 contained in the welding bolt retainer 13 that is also displayed having been fastened in a welded position on the workpiece. The welding bolt retainer 13 is surrounded by a probe in the shape of a rounded cylindrical case 17 slit several times along its length whose exterior side wall 21 runs concentric to axis A and concentric to the welding axle (compare FIG. 2). The case 17 is one piece fastened with a cover nut 51 that serves to lock the welding bolt retainer 13 to the welding axle 11 (FIG. 4).

The welding bolt retainer 13 and the welding bolt 15 are in the feed direction V opposite the case 17.

The welding bolt retainer 13 and the case 17 are connected electrically with a common contact recognition device 23 so that both are exposed to the same voltage.

The contact recognition device 23 that can be integrated with a contact circuit or a steering unit of the bolt welding head, for example, serves to determine the axial and radial position of the workpiece surface.

The case 17 can be closed in the perimeter direction. There can also be a number of finger-like extensions or a peg-shaped probe that is connected to the contact recognition device 23.

The bolt welding head displayed is adapted to weld the welding bolt 15 at a specific distance Z away from the side wall 25 of the workpiece 9. The distance Z is the so-called nominal distance. This nominal distance is supposed to be maintained by placing the welding bolt 15 in the depression 7 in a precise manner.

In order to weld the welding bolt 15 in its exact position, the following process is used:

a) The bolt welding head 3 is moved into position by the industrial robot 5 close to the workpiece, i.e., in a position in a sideways direction that corresponds approximately to the position of the welded bolt, which was programmed without occurring tolerances in the space as a reference value.

b) The robot 5 moves the bolt welding head 3 at a right angle to the feed direction V, in direction Bi to the case 17 that is part of the contact recognition device whose exterior side surface contacts the side wall 25. The contact recognition device 23, which can also act as a type of switch, sends a corresponding signal to the steering unit that is not shown, which immediately stops the industrial robot 5. The first position in which the bolt welding head is located is recorded and saved. Because the distance of axis A on the welding bolt 15 is known from the exterior cover surface 21 of the case 17 (Measurement X), the side position of the side surface of the side wall of axis A can be determined.

c) The robot 5 now moves the bolt welding head 3 in a second direction B2 that is set opposite to direction B1 in which the bolt welding head 3 was moved to the side wall 25. The bolt welding head 3 is moved in direction B2 by the nominal measurement Y (nominal distance Z-Measurement X) so that axle A is located at nominal distance X from the side wall 25.

d) Then the industrial robot 5 moves the welding bolt 15 in direction V close to the workpiece. The linear motor moves the welding axle 11 and thereby the welding bolt 15 in direction V until the welding until the welding bolt 15 comes into contact with the surface of the workpiece 9. The contact recognition device 23 reacts, the position of the welding axle 11 is determined using a path measurement system in the bolt welding head 3.

e) With the path controlled, welding axle 11 is raised in direction R by a predetermined distance from the workpiece surface.

f) Raising causes stroke ignition to generate an arc between the welding bolt 15 and workpiece 7.

g) Welding axle 11 is moved in a steered away position in direction V and the welding bolt 15 is dipped in the welding material that forms.

Welding bolt 15 is now fixed in its precise position on the workpiece.

The case 17 is connected through the slit electrically with the bolt retainer 13 and sprung radially. Touching of the workpiece is detected using a contact message (electrical current between the case 17 or the welding bolt 15 and the workpiece).

FIG. 3 displays another start situation for the bolt welding head where the welding bolt 15 must be attached in a horizontal direction to a wall that is not positioned in a flange or a depression. Here the bolt welding head is moved diagonal to the feed direction V far enough so the covering of the side wall 25 is contacted by the case 17. Then the bolt welding head will be moved back by the industrial robot in direction R so that the welding bolt 15 does not hit the side wall 25 during movement into the welding start position in direction B1. Then the bolt welding head 3 will move in direction B1 by a nominal measurement Y (Y=X+Shoulddistance Z) into the welding start position. From there, either the robot can move the bolt welding head 3 closer to the surface of the workpiece or the bolt welding head moves the welding axel 11 in direction V until the welding bolt 15 comes into contact with the workpiece 9. The following steps are the steps for welding the bolt already described in connection with FIG. 1:

FIG. 3 displays another start situation for the bolt welding head where the welding bolt 15 must be attached in a horizontal direction to a wall that is not positioned in a flange or a depression. Here the bolt welding head is moved diagonal to the feed direction V far enough so the covering of the side wall 25 is contacted by the case 17. Then the bolt welding head will be moved back by the industrial robot in direction R so that the welding bolt 15 does not hit the side wall 25 during movement into the welding start position in direction B1. Then the bolt welding head 3 will move in direction B1 by a nominal measurement Y (Y=X+distance Z) into the welding start position. From there, either the robot can move the bolt welding head 3 closer to the surface of the workpiece or the bolt welding head moves the welding axle 11 in direction V until the welding bolt 15 comes into contact with the workpiece 9. The following steps are the steps for welding the bolt already described in connection with FIG. 1:

When the bolt welding head 3 is moved sideways and the case 17 contacts the side surface of the workpiece, there will be certain hesitation until the robot 5 comes to a stop. The case 17 is moved sideways slightly in this first position so that the Measurement X does not correspond exactly to the distance of the axis from the side surface, rather it is greater than the actual distance. To correct this slight error, the bolt welding head will be moved in a second direction B2 set opposite to direction B1 in accordance with a modified movement until the contact recognition device 23 no longer signals contact with the workpiece. The robot 5 will immediately stop and will record and save the second position. The reference value will be determined from the first and second position, preferably the average between both positions. Based on this middle value, the bolt welding head 3 will be moved by the nominal measurement Y into the welding start position from which the welding bolt 15 will be moved only in an axial direction until it is welded.

When the side surfaces to be detected do not stand at a right angle to the movement direction B1 and the position of the workpiece can sway in the process, this could lead to inaccuracies when determining the position of the side surfaces. For this reason, the welding head my be set first in the feed direction V until the bolt touches the workpiece and the position of the workpiece in feed direction V is determined first. Then the bolt will be raised by a defined amount in direction R and finally, as explained, will move sideways to determine the position of the side surfaces.

What is claimed is:

1. A method of locating and welding a weld stud on a target surface of a workpiece having an adjacent side surface, wherein the weld stud is mounted in a stud welding head having a position recognition device mounted on a programmable multiaxial operating mechanism, said method comprising the following steps:

moving the stud welding head axially in a feed direction, bringing the stud welding head to the workpiece;

actuating the programmable multiaxial operating mechanism to move the stud welding head laterally in a first direction perpendicular to the feed direction to contact the side surface of the workpiece;

actuating the programmable multiaxial operating mechanism to move the stud welding head laterally in a second direction generally opposite to the first direction a predetermined distance to a predetermined start weld position; and moving the stud welding head axially in the feed direction to bring the weld stud into contact with the target surface of the workpiece.

2. The method as defined in claim 1, wherein the position recognition device signals contact between the stud welding head and the side surface of the workpiece as a first position of the stud welding head, wherein the first position is recorded and saved by a control, moving the stud welding head in the second direction opposite the first direction to a second position, where the position recognition device indicates that the weld stud head is no longer in contact with the side surface of the workpiece and the second position is recorded and saved, then continuing to move the stud welding head in the second direction to the predetermined welding start position based upon the first and second recorded positions of the stud welding head.

3. The method as defined in claim 2, wherein said method includes determining said predetermined welding start position by calculating the average between the first and second positions of the stud welding head.

4. The method as defined in claim 1, wherein said method includes using said contact recognition device to indicate contact between said weld stud and said target surface of said workpiece, then actuating said programmable multiaxial operating mechanism to withdraw said weld stud from said target surface a predetermined distance and initiating an arc between said weld stud and said target surface.

5. A stud welding apparatus for welding a stud on a target surface of a workpiece having an adjacent side surface, said stud welding apparatus comprising:

a programmable multiaxial operating mechanism;

a stud welding head mounted on said programmable multiaxial operating mechanism including a weld stud retainer adapted to receive a weld stud, an annular case surrounding said weld stud retainer in spaced relation and a contact recognition device connected to a control of said programmable multiaxial operating mechanism; and wherein said programmable multiaxial operating mechanism moves said stud welding head laterally in a first direction perpendicular to an axis of said stud welding head to contact said annular case with said side surface of said workpiece, generating a signal from said contact recognition device to said control, and then moving said stud welding head a predetermined distance in a second direction opposite to said first direction to a predetermined welding start position.

6. The stud welding apparatus as defined in claim 5, wherein said contact recognition device is connected to said annular case, such that said contact signaling device generates a signal upon contact of said annular case with said side surface of said workpiece.

7. The stud welding apparatus as defined in claim 6, wherein said annular case includes a plurality of radial slots, such that said annular case is resiliently biased inwardly upon contact with said side surface of said workpiece.

* * * * *

UNITED STATES PATENT AND TRADEMARK OFFICE
CERTIFICATE OF CORRECTION

PATENT NO. : 6,933,458 B2 Page 1 of 1
APPLICATION NO. : 10/204120
DATED : August 23, 2005
INVENTOR(S) : Ulrich Citrich et al.

It is certified that error appears in the above-identified patent and that said Letters Patent is hereby corrected as shown below:

Column 3,
Line 40, replace "Onto" with -- onto --.

Column 4,
Line 13, replace "Bi" with -- B1 --.
Line 62, replace "x+Should-distance" with -- X+distance --.

Signed and Sealed this

Twentieth Day of June, 2006

JON W. DUDAS
*Director of the United States Patent and Trademark Office*